(12) United States Patent
Adler et al.

(10) Patent No.: US 11,872,977 B2
(45) Date of Patent: Jan. 16, 2024

(54) BRAKE SYSTEM FOR A VEHICLE, VEHICLE AND METHOD OF CONTROLLING A BRAKE SYSTEM FOR A VEHICLE

(71) Applicant: Knorr-Bremse Systeme Fuer Nutzfahrzeuge GmbH, Munich (DE)

(72) Inventors: Tamas Adler, Erd (HU); Huba Nemeth, Budapest (HU); Kornel Straub, Pomáz (HU); Csaba Horvath, Biatorbagy (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 462 days.

(21) Appl. No.: 17/273,259

(22) PCT Filed: Sep. 2, 2019

(86) PCT No.: PCT/EP2019/073318
§ 371 (c)(1),
(2) Date: Mar. 3, 2021

(87) PCT Pub. No.: WO2020/057950
PCT Pub. Date: Mar. 26, 2020

(65) Prior Publication Data
US 2021/0347346 A1 Nov. 11, 2021

(30) Foreign Application Priority Data
Sep. 18, 2018 (EP) .................................... 18195180

(51) Int. Cl.
*B60T 8/94* (2006.01)
*B60T 8/17* (2006.01)
(Continued)

(52) U.S. Cl.
CPC .............. *B60T 8/94* (2013.01); *B60T 8/1701* (2013.01); *B60T 13/36* (2013.01); *B60T 13/385* (2013.01);
(Continued)

(58) Field of Classification Search
CPC ........ B60T 8/94; B60T 13/683; B60T 13/385; B60T 13/36; B60T 17/18; B60T 8/1701;
(Continued)

(56) References Cited

U.S. PATENT DOCUMENTS

2006/0230758 A1 10/2006 Tagata et al.
2019/0241164 A1* 8/2019 Nemeth ................ B60T 17/004
(Continued)

FOREIGN PATENT DOCUMENTS

CN 102325678 A 1/2012
CN 103079914 A 5/2013
(Continued)

OTHER PUBLICATIONS

WO document No. 2018/228828 to Nemeth et al published on Dec. 20, 2018.*
(Continued)

*Primary Examiner* — Pamela Rodriguez
(74) *Attorney, Agent, or Firm* — NORTON ROSE FULBRIGHT US LLP; Gerard A. Messina (57) ABSTRACT

A brake system for a vehicle includes a first axle pressure modulator (APM) for service-brake-chambers for a first vehicle-axle, a second axle pressure modulator for spring-brake-cylinders for a second vehicle-axle, the second APM being connected to an electronic-brake-control-unit, which is configured to issue a first electric-control-signal for controlling the first APM and a second electric-control-signal for controlling the second APM, an intelligent foot brake module, which is configured to issue a first pneumatic-
(Continued)

control-signal for controlling the first APM and a second pneumatic-control-signal for controlling the second APM, an electronic parking brake controller, which is configured to issue a second pneumatic parking brake signal for controlling the spring-brake-cylinders, and a pressure control valve, which is configured to convert the second pneumatic parking brake signal into a first pneumatic parking brake signal for controlling the first APM.

12 Claims, 3 Drawing Sheets

(51) Int. Cl.
*B60T 13/36* (2006.01)
*B60T 13/38* (2006.01)
*B60T 13/66* (2006.01)
*B60T 13/68* (2006.01)
*B60T 15/02* (2006.01)
*B60T 17/18* (2006.01)
*B62D 5/00* (2006.01)

(52) U.S. Cl.
CPC .......... *B60T 13/662* (2013.01); *B60T 13/683* (2013.01); *B60T 15/027* (2013.01); *B60T 17/18* (2013.01); *B60T 2270/402* (2013.01); *B60T 2270/403* (2013.01); *B60T 2270/404* (2013.01); *B60T 2270/414* (2013.01); *B60T 2270/82* (2013.01); *B62D 5/00* (2013.01)

(58) Field of Classification Search
CPC ............ B60T 15/027; B60T 2270/402; B60T 2270/82; B60T 2270/404; B60T 2270/403; B60T 2270/414; B60T 13/662; B62D 5/00
See application file for complete search history.

(56) References Cited

U.S. PATENT DOCUMENTS

2020/0198609 A1* 6/2020 Nemeth .................. B60T 7/045
2021/0323522 A1* 10/2021 Adler .................... B60T 13/581

FOREIGN PATENT DOCUMENTS

| CN | 104955692 A | 9/2015 |
| CN | 105015530 A | 11/2015 |
| DE | 102008009043 B3 | 5/2009 |
| DE | 102016005318 A1 | 11/2017 |
| EP | 2794368 B1 | 11/2015 |

OTHER PUBLICATIONS

Translation of German Patent No. DE 102008009043 to Steinberger et al obtained from website: https://worldwide.espacenet.com on Jul. 23, 2023.*
International Search Report for PCT/EP2019/073318 dated Dec. 2, 2019.

* cited by examiner

BRAKE SYSTEM FOR A VEHICLE, VEHICLE AND METHOD OF CONTROLLING A BRAKE SYSTEM FOR A VEHICLE

FIELD OF THE INVENTION

The present invention relates to a brake system for a vehicle, to a vehicle with said brake system, and to a method of controlling a brake system for a vehicle.

BACKGROUND INFORMATION

Autonomous or near-autonomous operation of transport vehicles is a relatively new field of technology. More sophisticated functions require special hardware infrastructure. For example, present commercial vehicle systems require the presence and attention of a driver. However, in the future the driver will be less involved in the driving control task of the vehicle, and automated systems are supposed to take over more significant driving functions, which requires increased reliability levels and consequently different types of system redundancies.

Commercial vehicles conventionally use electro-pneumatic or by-wire brake systems, wherein the electronic part of the control is realized as a single-circuit control. In case of malfunction of the control electronics, the driver is able to control the pneumatic part of the brake system by their foot because a two-circuit pneumatic backup system still is available. In case of highly automated vehicles where the driver is not in the control loop anymore, or even not available or present in the vehicle, the above brake system would be unsatisfactory, since there is no arrangement/structure which would substitute the brake control by the driver in case of malfunction of the single electronic control circuit. Therefore some redundancy is to be added to the control of a brake system.

Patent document DE 10 2008 009 043 B3 discusses a redundant brake system for a commercial vehicle. The system utilizes a parking brake integrated into an air supply unit as a redundant brake actuator. For axles not equipped with spring parking brake chambers, a control output of a trailer control module is used as pneumatic control input of axle modulators.

Patent document EP 2 794 368 B1 discusses a redundant brake system for a commercial vehicle. The system utilizes the parking brake integrated into an air supply unit as a redundant brake actuator. For axles not equipped with spring parking brake chambers the air supply unit includes an additional electro-pneumatic modulator to generate control pressure for the pneumatic control input of the axle modulators.

SUMMARY OF THE INVENTION

Against this background, it is an object of the present invention to provide an improved brake system for a vehicle, an improved vehicle with said brake system, and an improved method of controlling a brake system for a vehicle.

This object may be achieved by a brake system for a vehicle, by a vehicle with said brake system, and by a method of controlling a brake system for a vehicle according to the main claims.

According to embodiments, for example, there may be provided a solution for a multiple redundant brake architecture where an intelligent foot brake module (iFBM) and rEPBi (EPB=electronic parking brake) architectures are combined to provide two additional control circuits. The system may comprise a brake system with three independent electric brake control circuits, which can be necessary for autonomous driving case, where the vehicle should be able to proceed its mission even in case of a single failure. There may be a switch between the redundant parts of the brake systems. According to an embodiment, such a switch may be automated. In case of any malfunction a secondary or a tertiary redundant brake system may be activated.

A brake system for a vehicle comprises:

a first axle pressure modulator for service brake chambers associated with a first axle of the vehicle;

a second axle pressure modulator for spring brake cylinders associated with a second axle of the vehicle;

an electronic brake control unit, wherein the electronic brake control unit is configured to issue a first electric control signal for controlling the first axle pressure modulator and a second electric control signal for controlling the second axle pressure modulator;

an intelligent foot brake module, wherein the intelligent foot brake module is configured to issue a first pneumatic control signal for controlling the first axle pressure modulator and a second pneumatic control signal for controlling the second axle pressure modulator;

an electronic parking brake controller, wherein the electronic parking brake controller is configured to issue a second pneumatic parking brake signal for controlling the spring brake cylinders; and a pressure control valve, wherein the pressure control valve is configured to convert the second pneumatic parking brake signal into a first pneumatic parking brake signal for controlling the first axle pressure modulator.

The vehicle may be a utility vehicle or commercial vehicle, for example a truck, bus or the like. The first axle may be a front axle and the second axle a rear axle of the vehicle. The service brake chambers and the spring brake cylinders may represent brake actuators of the brake system or the vehicle. According to an embodiment, the pressure modulators, the electronic brake control unit, the intelligent foot brake module and the electronic parking brake controller may be common units as already used in vehicles. The electronic brake control unit, the intelligent foot brake module and the electronic parking brake controller may be redundantly used to activate the service brake chambers and the spring brake cylinders in case of a service brake demand. The service brake demand may be different to a park brake demand being used to activate the brakes while the vehicle is in or close to a parking position. The service brake demand may be triggered by a driver of the vehicle or by an electronic control unit for an automated driving mode. Due to the pressure control valve, the electronic parking brake controller may be used to activate the service brake chambers associated with the first axle additionally to the spring brake cylinders associated with the second axle in case of a service brake demand. Thus a redundant brake system can be realized.

The electronic brake control unit may be part of a first control circuit, the intelligent foot brake module may be part of a second control circuit and the electronic parking brake controller may be part of a third control circuit. The first control circuit may be configured to provide a primary service brake functionality. If the brake system is intact, the electronic brake control may be used to activate the service brake chambers and the spring brake cylinders in case of a service brake demand. In the event of a malfunction of the first control circuit the second control circuit and/or the third control circuit are configured to provide redundant service brake functionalities. In the event of a malfunction of the first control circuit the intelligent foot brake module or the electronic parking brake controller may be used to activate the service brake chambers and the spring brake cylinders in case of a service brake demand. Thus, one of the second and third control circuits may be selected to replace the first control circuit in case of a malfunction of the first control circuit in order to execute a service brake demand.

The brake system may comprise a first electric power supply unit, which may be connected to the electronic brake control unit. The first electric power supply may be configured to provide electric power necessary to run the electronic brake control unit. The brake system may comprise a second power supply unit, which may be connected to the intelligent foot brake module. The second electric power supply may be configured to provide electric power necessary to run the intelligent foot brake module. The brake system may comprise a third power supply unit, which may be connected to the electronic brake control unit. The third electric power supply may be configured to provide electric power necessary to run the electronic brake control unit. Thus there may be three independent electric power supplies.

The brake system may comprise a first pneumatic selector valve being configured to select the first pneumatic control signal or the first pneumatic parking brake signal for controlling the first axle pressure modulator. The first pneumatic selector valve may provide a switching functionality for switching between the second control circuit and the third second control circuit with regard to the service brake chambers.

The brake system may comprise a second pneumatic selector valve, being configured to connect the second pneumatic control signal to the second axle pressure modulator or to connect an exhaust port to the second axle pressure modulator. The first pneumatic selector valve may provide a switching functionality for switching between the second control circuit and the third second control circuit with regard to the spring brake cylinders.

The pneumatic selector valves may have a default state. In the default state the pneumatic selector valves may be configured to select the first pneumatic control signal for controlling the first axle pressure modulator and configured to connect the second pneumatic control signal to the second axle pressure modulator to the second axle pressure modulator. Thus the intelligent foot brake module can be used as a default replacement for the electronic brake control unit.

In an alternative embodiment the pneumatic selector valves may be configured to select the first pneumatic parking brake signal for controlling the first axle pressure modulator and configured to connect an exhaust port to the second axle pressure modulator. Thus the electronic brake control unit can be used as a default replacement for the electronic brake control unit.

The pressure control valve may be an inverting relay valve. Such a valve is cost-efficient and reliable.

The brake system may comprise a trailer control module for controlling braking functions of a trailer of the vehicle. The electronic brake control unit may be configured to issue a third electric control signal for controlling the trailer control module. The intelligent foot brake module may be configured to issue the first pneumatic control signal further for controlling the trailer control module. The electronic parking brake controller may be configured to issue a third pneumatic parking brake signal for controlling the trailer control module. The trailer control module may be common unit as already used in vehicles. If the brake system is intact, the electronic brake control may be used to control the trailer control module. In the event of a malfunction of the first control circuit the intelligent foot brake module or the electronic parking brake controller may be used to control the trailer control module. Thus, one of the second and third control circuits may be selected to replace the first control circuit in case of a malfunction of the first control circuit with regard to activate the brakes of a trailer.

The brake system may comprise a left pressure control valve and a right pressure control valve. The left pressure control valve may be configured to control a pressure of a left pneumatic pressure signal provided by the first axle pressure modulator for activating a left service brake chamber associated with a left wheel of the first axle of the vehicle. The right pressure control valve may be configured to control a pressure of a right pneumatic pressure signal provided by the first axle pressure modulator for activating a right service brake chamber associated with a right wheel of the first axle of the vehicle. Thus the pressure provided to the left and the right service brake chambers may be adjusted individually.

The electronic brake control unit may be configured to issue a left electric control signal for controlling the left pressure control valve and a right electric control signal for controlling the right pressure control valve. Thus a redundant steering system can be realized. The autonomous driving has special demand against the steering system of an autonomous vehicle also. The intact steering system must be supplied with a redundant steering system, which requirement can be fulfilled by a special function of the brake system, namely the steer by braking.

The brake system or the vehicle may comprise a steering gear unit. The steering gear unit and the electronic brake control unit may be connected to different electric power supply units.

A vehicle comprises:
a first axle and a second axle;
service brake chambers associated with the first axle;
spring brake cylinders associated with the second axle; and
an embodiment of the aforementioned brake system.

The brake system may be used instead of a common brake system used for vehicles.

A method of controlling a brake system for a vehicle, wherein the brake system is a an embodiment of the aforementioned, comprises the following steps:
receiving an error signal representing a malfunction of the a first control circuit comprising the electronic brake control; and
transmitting a service brake demand signal to the intelligent foot brake module or the electronic parking brake controller responsive to the error signal.

The method or the steps of the method may be executed using a controller. Thus, the method may be executed to control an embodiment of the aforementioned brake system.

Embodiments of the approach presented here shall be explained in greater detail in the subsequent description with reference to the figures.

DETAILED DESCRIPTION

In the following description of advantageous embodiments of the present invention, the same or similar reference numerals shall be used for the elements depicted in the various figures and acting in a similar way, wherein repeated description of these elements shall be omitted.

Figure 1:
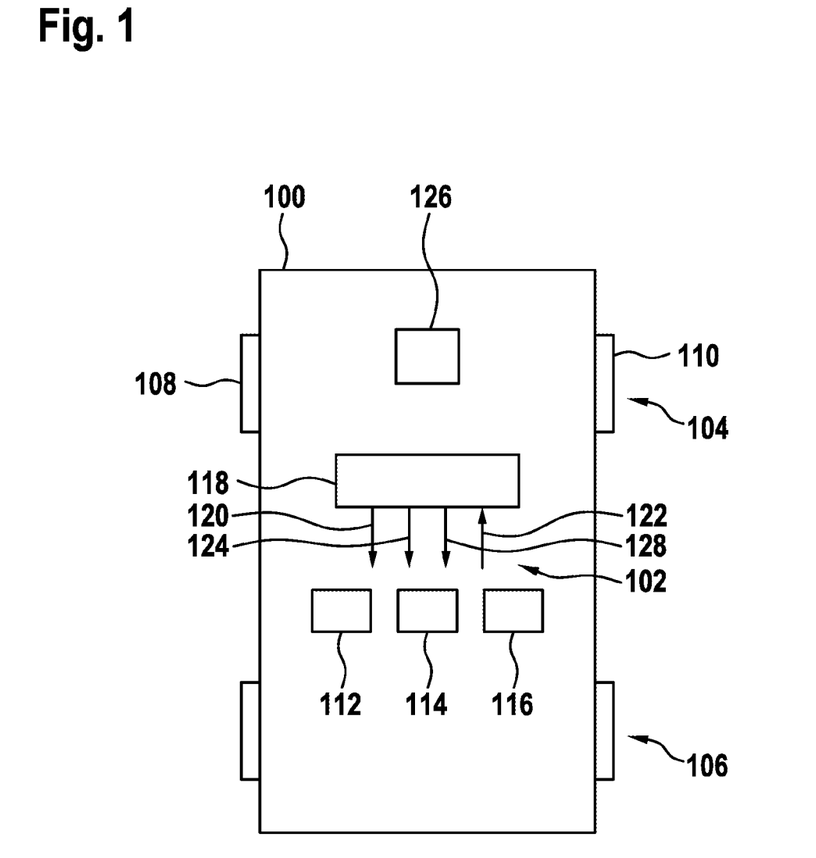
FIG. 1 shows a schematic illustration of a vehicle comprising a brake system according to an embodiment of the present invention.

FIG. 1 shows a schematic illustration of a vehicle 100 comprising a brake system 102 according to an embodiment of the present invention. The vehicle 100 is a utility vehicle or commercial vehicle, such as a truck. The vehicle 100 comprises a first axle 104, in particular a front axle, and at least one second axle 106, in particular a rear axle, according to this embodiment. The first axle 104 comprises a left wheel 108 and a right wheel 110.

The brake system 102 comprises a first control circuit 112, a second control circuit 114 and a third control circuit 116. In case the first control circuit 112 is intact, the first control circuit 112 is used to activate the brakes of the vehicle 100 in response to a service brake demand. In case of a malfunction of the first control circuit 112, the second control circuit 114 or the third control circuit 116 are used to activate the brakes of the vehicle in response to the service brake demand instead of the first control circuit 112. According to an embodiment, in case of a malfunction of the first control circuit 112, the second control circuit 114 is activated an in case of a further malfunction of the second control circuit 114, the third control circuit 116 is used to activate the brakes of the vehicle in response to the service brake demand.

According to an embodiment, the vehicle 100 comprises an electronic control unit 118 (ECU) for controlling speed and optionally driving direction of the vehicle 100. The electronic control unit 118 may be connected to the control circuits 112, 114, 116 via a control unit interface, like a CAN-bus. In order to reduce the speed of the vehicle 100, the electronic control unit 118 is configured to provide a service brake demand signal 120. According to an embodiment the electronic control unit 118 is configured to provide the service brake demand signal 120 to the first control circuit 112. According to an embodiment the electronic control unit 118 is configured to provide the service brake demand signal 120 to the second control circuit 114 or the third control circuit 116, when an error signal 122 indicates a malfunction of the first control circuit 112. According to an embodiment the electronic control unit 118 is configured to provide a switch signal 124, when the error signal 122 indicates a malfunction of the first control circuit 112, wherein the switch signal 124 is configured to switch from the first control circuit 112 to the second control circuit 114 or the third control circuit 116. The electronic control unit 118 may be part of the brake system 102. According to an embodiment, the control unit 118 is configured to provide the service brake demand while the vehicle is in a full or partial autonomous operation mode. In this case the control circuits 112, 114, 116 can be automatically operated without an interaction of a driver of the vehicle.

According to an embodiment the brake system 102 comprises a monitoring unit for monitoring a state of health of the brake system 102 and in particular of the first control circuit 112. The monitoring unit is configured to provide the error signal 122.

According to an embodiment, the vehicle 100 comprises a steering gear unit 126 for steering the vehicle 100, for example by controlling a steering box assembly of the vehicle 100. The control unit 118 is configured to control the steering gear unit 126 in order to control the driving direction of the vehicle 100. In case of a malfunction of the steering gear unit 126, the control unit 118 is configured to provide a steering demand, for example a steering signal 128. According to an embodiment the steering signal 128 is used by one of the circuits 112, 114, 116 to control the driving direction by activating the brakes of the vehicle 100.

Figure 2:
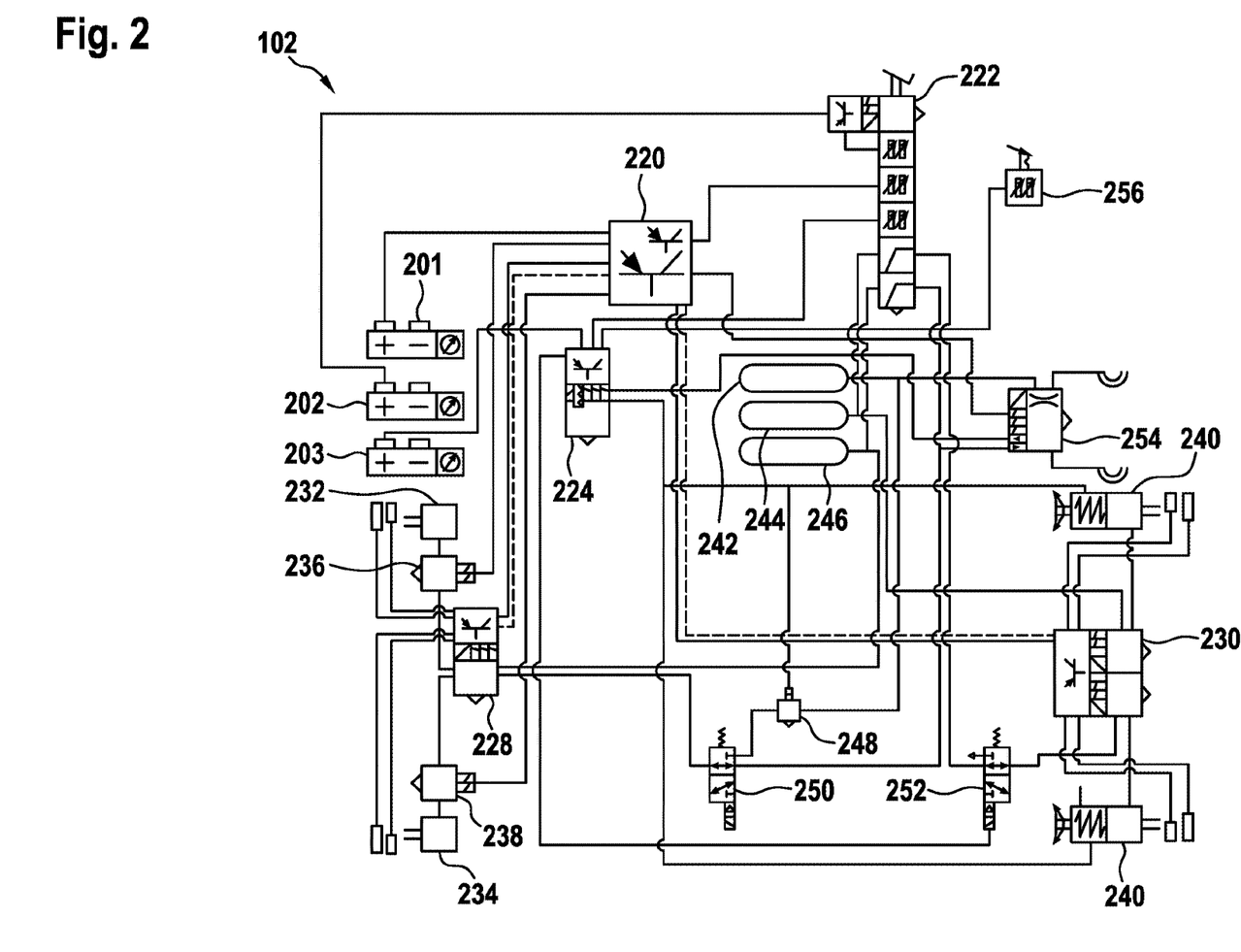
FIG. 2 shows a schematic illustration of a brake system according to an embodiment of the present invention.

FIG. 2 shows a schematic illustration of a brake system 102 according to an embodiment of the present invention. The brake system 102 corresponds or is similar to the brake system shown in FIG. 1.

The brake system 102 according to this embodiment comprises a first electric power supply unit 201, a second electric power supply unit 202, and a third electric power supply unit 203. The brake system 102 further comprises an electronic brake control unit 220, an intelligent foot brake module 222 and an electronic parking brake controller 224, a first axle pressure modulator 228, a second axle pressure modulator 230, a left service brake chamber 232, a right service brake chamber 234, a left pressure control valve 236, a right pressure control valve 238 and two spring brake cylinders 240.

According to an embodiment, the brake system 110 further comprises a first compressed air supply module 242, a second compressed air supply module 244 and a third compressed air supply module 246.

According to an embodiment, the brake system 110 further comprises a pressure control valve 248, a first pneumatic selector valve 250 and a second pneumatic selector valve 252.

According to an embodiment, the brake system 110 optionally comprises a trailer control module 254. The trailer control module 254 is configured to control braking functions of a trailer coupled to the vehicle. The trailer control module 254 is connected to the first compressed air supply module 242.

According to an embodiment, the first electric power supply unit 201 and the electronic brake control unit 220 form part of the first control circuit, the second electric power supply unit 202 and the intelligent foot brake module 222 form part of the second control circuit and the third electric power supply unit 203 and the electronic parking brake controller 224 form part of the third control circuit described with reference to FIG. 1.

The first electric power supply unit 201 is electrically connected to the electronic brake control unit 220 via an analogous electric supply line. The second electric power supply unit 202 is electrically connected to the intelligent foot brake module 222 via a further analogous electric supply line. The third electric power supply unit 203 is electrically connected to the electronic parking brake controller 224 via a further analogous electric supply line.

The electronic brake control unit 220 is electrically connected to the first axle pressure modulator 228 via an analogous electric signal or supply line and via a digital electric signal line. Furthermore, the electronic brake control unit 220 is electrically connected to the second axle pressure modulator 230 via an analogous electric signal or supply line and via a digital electric signal line. The electronic brake control unit 220 is configured to issue a first electric control signal for controlling the first axle pressure modulator 228 and a second electric control signal for controlling the second axle pressure modulator 230. Also, the electronic brake control unit 220 is electrically connected to the trailer control module 228 and to the intelligent foot brake module via analogous electric signal lines.

Optionally the electronic brake control unit 220 is electrically connected to the left pressure control valve 236 and the right pressure control valve 238 via two separate analogous electric signal or supply lines. According to an embodiment, the electronic brake control unit 220 is configured to issue a left electric control signal for controlling the left pressure control valve 236 and a right electric control signal for controlling the right pressure control valve 238. Thus the electronic brake control unit 220 can be used to control the driving direction of the vehicle additionally to or instead of a steering gear unit of the vehicle. According to an embodiment, the steering gear unit and the electronic brake control unit 220 are connected to different electric power supply units 201, 202, 203.

The first axle pressure modulator 228, the service brake chambers 232, 234 and the pressure control valves 236, 238 are associated with a first axle of the vehicle. The first axle pressure modulator 228 is fluidically connected to the third compressed air supply module 246 via a pneumatic supply line The first axle pressure modulator 228 is fluidically connected to the left pressure control valve 236 via a pneumatic control line and to the right pressure control valve 238 via a further pneumatic control line. The left pressure control valve 236 is fluidically connected to the left service brake chamber 232 via a pneumatic control line and the right pressure control valve 238 is fluidically connected to the right service brake chamber 234 via a further pneumatic control line.

Furthermore, the first axle pressure modulator 228 is optionally electrically connected to a group of brake sensors for the first axle via analogous electric signal and supply lines.

The second axle pressure modulator 230 and the spring brake cylinders 240 are associated with a second axle of the vehicle. The second axle pressure modulator 230 is fluidically connected to the second compressed air supply module 244 via a pneumatic supply line.

Furthermore, the second axle pressure modulator 230 is fluidically connected to the spring brake cylinders 240 via pneumatic service brake control lines. Also, the second axle pressure modulator 230 is electrically connected to a group brake sensors for the second axle via analogous electric signal and supply lines.

The electronic parking brake controller 224 is electrically connected to the pneumatic selector valves 250, 252 via an analogous electric signal line. Furthermore, the electronic parking brake controller 224 is electrically connected to the intelligent foot brake module 222 and optionally to a park brake lever sensor 256 via two separate analogous electric signal lines. The park brake lever sensor 256 can be operated by a driver of the vehicle in order to issue a park brake demand. Thus, the electronic parking brake controller 224 can be used to provide a park brake functionality and a service brake functionality. The electronic parking brake controller 224 is fluidically connected to the spring brake cylinders 240 and to the pressure control valve 248 via a pneumatic control line. The electronic parking brake controller 224 is configured to issue a second pneumatic parking brake signal for controlling the spring brake cylinders 240. Further, the electronic parking brake controller 224 is fluidically connected to the trailer control module 254 via a pneumatic brake control line.

A first pressure control unit of the intelligent foot brake module 222 is fluidically connected to the third compressed air supply module 246 via a pneumatic supply line and to a second input of the first pneumatic selector valve 250 via a pneumatic control line. An output of the first pneumatic selector valve 250 is fluidically connected to the first axle pressure modulator 228 via a pneumatic control line. The intelligent foot brake module 222 is configured to issue a first pneumatic control signal for controlling the first axle pressure modulator 228 via the first pneumatic selector valve 250.

A second pressure control unit of the intelligent foot brake module 222 is fluidically connected to the second compressed air supply module 244 via a pneumatic supply line and to a second input of the second pneumatic selector valve 252 via a pneumatic control line. An output of the second pneumatic selector valve 252 is fluidically connected to the second axle pressure modulator 228 via a pneumatic control line. A first input of the second pneumatic selector valve 252 is fluidically connected to an exhaust port via a pneumatic control line. The intelligent foot brake module 222 is configured to issue a second pneumatic control signal for controlling the second axle pressure modulator 230 via the second pneumatic selector valve 252.

An input of the pressure control valve 248 is fluidically connected to the first compressed air supply module 242 via a pneumatic supply line. An output of the pressure control valve 248 is fluidically connected to a first input of the first pneumatic selector valve 250 via a pneumatic control line. The pressure control valve 248 is configured to convert the second pneumatic parking brake signal provided by the electronic parking brake controller 224 into a first pneumatic parking brake signal for controlling the first axle pressure modulator 228 via the first pneumatic selector valve 250.

In case the brake system 102 comprises the trailer control module 254, the electronic brake control unit 220 is configured to issue a third electric control signal for controlling the trailer control module 254, the first pneumatic control signal provided by the intelligent foot brake module 222 is further used for controlling the trailer control module 254, and the electronic parking brake controller 224 is configured to issue a third pneumatic parking brake signal for controlling the trailer control module 254.

According to an embodiment, FIG. 2 shows a schematic of a multiple redundant commercial vehicle electronic brake system 102 or electro-pneumatic brake system 102. The main components of the brake system 102 are described in the following. In the following the first axle represents a front axle and the second axle represents a rear axle, thus "first" can be used as a synonym for "front" and "second" can be used as a synonym for "rear".

The brake system 102 is redundantly supplied by the power supply units 201, 202, 203 which are realized as separate batteries or power supplies. The primary EBS electronic brake control unit 220 is supplied from the first power supply unit 201. The electronic brake control unit 220 is electronically controlling the front axle pressure modulator 228, the pressure control valves 236, 238 on the front axle, the rear axle pressure modulator 230 and the trailer control module 254. The front axle wheel brakes are actuated by the service brake chambers 232, 234, while on the rear axle by spring brake cylinders 240 which are also known as spring brake combi cylinders.

A first redundant pair, for example the second or secondary control circuit mentioned in FIG. 1, of the brake system 102 is provided by the intelligent foot brake module 222 supplied by the second electric power supply unit 202. The intelligent foot brake module 222 is equipped with a pressure control unit, which can actuate the intelligent foot brake module 222 similar to a driver by his/her foot. The driven pressure by the pressure modulator unit of the intelligent foot brake module 222 is proportional to the pedal stroke.

A second redundant pair, for example the third or tertiary control circuit mentioned in FIG. 1, of the brake system 102 is provided by the electronic parking brake controller 224, also know as electronic parking brake (EPB) modulator, which is supplied by another battery, here the third electric power supply unit 203. The electronic parking brake controller 224 is actuating the spring brake cylinders 240 on the rear axle. Moreover the electronic parking brake controller 224 provides a pneumatic control signal to the trailer control module 254.

The front axle or any other axles not equipped with spring brake cylinders 240, in this case the axle or the axles equipped with service brake chambers 232, 234, are controlled by the electronic parking brake controller 224 using a pressure control valve 248, for example an inverse relay or a proportional valve. The output of the pressure control valve 248 is commanding the pneumatic control pressure for the first axle pressure modulator 228.

The service brake can be commanded by the driver by the redundant brake pedal sensor of the intelligent foot brake module 222, which provides separate demand signals for all the three control circuits. The parking brake can be commanded by the driver by the park brake lever sensor 256.

The pressure control valve 248 can be a standalone unit or integrated into the electronic parking brake controller 224 or the first axle pressure modulator 228. The electronic parking brake controller 224 can be also a standalone unit or integrated into any other modules like a compressed air processing unit.

Switching between the secondary and tertiary redundant circuits is ensured by pneumatic selector valves 250, 252, for example by two 3/2 monostable solenoids. The default state can be any of the two but the example in FIG. 1 priories the secondary circuit. It shows that the pneumatic selector valves 250, 252 connects the output of the secondary control circuit, here the output of the intelligent foot brake module 222 to the backup port of the first axle pressure modulator 228 and the second axle pressure modulator 230. If the pneumatic selector valves 250, 252 are energized, then the output of the pressure control valve 248, for example the inverting relay valve, is connected to the backup port of first axle pressure modulator 228, and the backup port of the second axle pressure modulator 230 is exhausted to ambient.

When the brake system 102 is fully intact the service brake is controlled by the primary electronic brake control unit 220 as a master. It controls electronically its axle modules, here the first axle pressure modulator 228 and the second axle pressure modulator 230, and the trailer control module 254. So far it corresponds to the state of the art. In case of malfunction of the primary electronic brake control unit 220 or its power supply, here the first electric power supply unit 201, the brake control is taken over by the secondary iFBM module, here the intelligent foot brake module 222. The driven pressure of the pressure modulator unit of the intelligent foot brake module 222 generates pedal stroke. Further operation of the intelligent foot brake module 222 is similar to a conventional foot brake module and generates control pressure for the axle modulators 228, 230.

In case of any further malfunction of the secondary intelligent foot brake module222, the pneumatic selector valves 250, 252 will be actuated and the brake control is taken over by the tertiary EPB module, here the electronic parking brake controller 224 and the axles equipped by spring brake chambers 240 are actuated by the parking brake control, while other axles without spring brake chamber 240 are controlled pneumatically through the pressure control valve 248, here the inverse valve, and through the first axle pressure modulator 228. In case the electronic parking brake controller 224 or its power supply, here the third electric power supply unit 203 has any malfunction the primary EBS electronics, here the electronic brake control unit 220 is controlling the brake system 102 as in normal case and the parking brake function can be also simulated in the case by the service brake actuation.

According to an embodiment, the brake system 102 further provides a redundant steering system.

For a steer by brake function, the primary EBS circuit comprising the electronic brake control unit 220, can generate different pressures on each side on the front axle with the help of the pressure control valves 236, 238 based on a steering demand as a redundancy for a steering gear. The steering gear may correspond to the steering gear unit as shown in FIG. 1.

The pressure difference between the left and the right side on the front axle causes a brake force difference sidewise, which causes a yaw-moment. Since the primary electronic brake control unit 220 is powered from the first electric power supply unit 201, therefore the steering gear should be supplied from the second electric power supply unit 202 and/or the third electric power supply unit 203.

According to an embodiment, the brake system 102 of a commercial vehicle with an electro-pneumatic service brake system and an electro-pneumatic parking brake system, as shown in FIG. 2 comprises multiple redundancy, with control circuits more than two, in order that an automated vehicle can proceed its mission even in case of any single failure. The control circuits used for redundancy may be the second control circuit comprising the intelligent foot brake module and the third control circuit comprising the electronic parking brake controller 224.

According to an embodiment, the brake control pressure of the second or the third brake circuits is selected by pneumatic selector valves 250, 252. For example, the selector valves 250, 252 are connected in a way, that the backup control ports of the first axle pressure modulator 228 can be connected to the output of the foot brake module, for example the intelligent foot brake module 222, or to the pressure control valve 248 of the EPB system comprising the electronic parking brake controller 224. The backup port of the second axle pressure modulator 230 is exhausted to the ambient. The control valve 248 may be realized as an inverting relay valve.

According to an embodiment, the default state of the pneumatic selector valves 250, 252 ensures the outputs of the intelligent foot brake module 222. The default state of the selector valves 250, 252 ensures the outputs of the electronic parking brake controller and the pressure control valve 248.

According to an embodiment, the brake system 102 is driven to generate different brake pressure level via pressure control valves 236, 238 to the left and right brake chambers 232, 234 on the front axle based on the steering demand, which generates yaw-moment.

Figure 3:
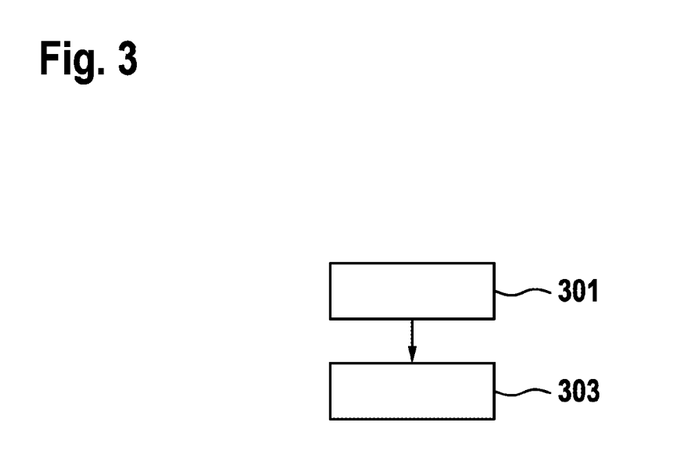
FIG. 3 shows a flowchart of a method of controlling a brake system according to an embodiment of the present invention.

FIG. 3 shows a flowchart of a method of controlling a brake system according to an embodiment of the present invention. The method is executable in connection with a brake system as described with reference to one of the preceding figures or a similar brake system.

The method comprises a step 301 of receiving an error signal representing a malfunction of a first control circuit comprising the electronic brake control of the brake system and a step 303 of transmitting a service brake demand signal to the intelligent foot brake module or the electronic parking brake controller of the brake system responsive to the error signal.

The reference numeral list is as follows:
- 100 vehicle
- 102 brake system
- 104 first axle
- 106 second axle
- 108 left wheel
- 110 right wheel
- 112 first control circuit
- 114 second control circuit
- 116 third control circuit
- 118 control unit
- 120 service brake demand signal
- 122 error signal
- 124 switch signal
- 126 steering gear unit
- 128 steering signal
- 201 first electric power supply unit
- 202 second electric power supply unit
- 203 third electric power supply unit
- 220 electronic brake control unit
- 222 intelligent foot brake module
- 224 electronic parking brake controller
- 228 first axle pressure modulator
- 230 second axle pressure modulator
- 232 left service brake chamber
- 234 right service brake chamber
- 236 left pressure control valve
- 238 right pressure control valve
- 240 spring brake cylinders
- 242 first compressed air supply module
- 244 second compressed air supply module
- 246 third compressed air supply module
- 248 pressure control valve
- 250 first pneumatic selector valve
- 252 second pneumatic selector valve
- 254 trailer control module
- 256 park brake lever sensor
- 301 receiving an error signal
- 303 transmitting a service brake demand signal

The invention claimed is:

1. A brake system for a vehicle, comprising:
   a first axle pressure modulator for service brake chambers associated with a first axle of the vehicle;
   a second axle pressure modulator for spring brake cylinders associated with a second axle of the vehicle;
   an electronic brake control unit configured to issue a first electric control signal for controlling the first axle pressure modulator and a second electric control signal for controlling the second axle pressure modulator;
   an intelligent foot brake module configured to issue a first pneumatic control signal for controlling the first axle pressure modulator and a second pneumatic control signal for controlling the second axle pressure modulator;
   an electronic parking brake controller configured to issue a second pneumatic parking brake signal for controlling the spring brake cylinders; and
   a pressure control valve configured to convert the second pneumatic parking brake signal into a first pneumatic parking brake signal for controlling the first axle pressure modulator.

2. The brake system of claim 1, wherein the electronic brake control unit is part of a first control circuit, the intelligent foot brake module is part of a second control circuit and the electronic parking brake controller is part of a third control circuit, wherein the first control circuit is configured to provide a primary service brake functionality and in the event of a malfunction of the first control circuit the second control circuit and/or the third control circuit are configured to provide a redundant service brake functionality.

3. The brake system of claim 1, further comprising:
   a first electric power supply unit connected to the electronic brake control unit;
   a second power supply unit connected to the intelligent foot brake module; and
   a third power supply unit connected to the electronic brake control unit.

4. The brake system of claim 1, further comprising:
   a first pneumatic selector valve to select the first pneumatic control signal or the first pneumatic parking brake signal for controlling the first axle pressure modulator.

5. The brake system of claim 1, further comprising:
   a second pneumatic selector valve to connect the second pneumatic control signal to the second axle pressure modulator or to connect an exhaust port to the second axle pressure modulator.

6. The brake system of claim 1, wherein the pressure control valve is an inverting relay valve.

7. The brake system of claim 1, further comprising:
   a trailer control module for controlling braking functions of a trailer of the vehicle, wherein the electronic brake control unit is configured to issue a third electric control signal for controlling the trailer control module, wherein the intelligent foot brake module is configured to issue the first pneumatic control signal further for controlling the trailer control module, and wherein the electronic parking brake controller is configured to issue a third pneumatic parking brake signal for controlling the trailer control module.

8. The brake system of claim 1, further comprising:
   a left pressure control valve and a right pressure control valve, wherein the left pressure control valve is configured to control a pressure of a left pneumatic pressure signal provided by the first axle pressure modulator for activating a left service brake chamber associated with a left wheel of the first axle of the vehicle, and wherein the right pressure control valve is configured to control a pressure of a right pneumatic pressure signal provided by the first axle pressure modulator for activating a right service brake chamber associated with a right wheel of the first axle of the vehicle.

9. The brake system of claim 8, wherein the electronic brake control unit is configured to issue a left electric control signal for controlling the left pressure control valve and a right electric control signal for controlling the right pressure control valve.

10. The brake system of claim 9, further comprising:
    a steering gear unit, wherein the steering gear unit and the electronic brake control unit are connected to different electric power supply units.

11. A vehicle, comprising:

a first axle and a second axle;

service brake chambers associated with the first axle;

spring brake cylinders associated with the second axle; and a brake system, including:

a first axle pressure modulator for service brake chambers associated with a first axle of the vehicle;

a second axle pressure modulator for spring brake cylinders associated with a second axle of the vehicle;

an electronic brake control unit configured to issue a first electric control signal for controlling the first axle pressure modulator and a second electric control signal for controlling the second axle pressure modulator;

an intelligent foot brake module configured to issue a first pneumatic control signal for controlling the first axle pressure modulator and a second pneumatic control signal for controlling the second axle pressure modulator;

an electronic parking brake controller configured to issue a second pneumatic parking brake signal for controlling the spring brake cylinders; and     a pressure control valve configured to convert the second pneumatic parking brake signal into a first pneumatic parking brake signal for controlling the first axle pressure modulator.

12. A method of controlling a brake system for a vehicle, the method comprising:

receiving an error signal representing a malfunction of a first control circuit including an electronic brake control unit; and transmitting a service brake demand signal to an intelligent foot brake module or an electronic parking brake controller responsive to the error signal:

wherein the brake system includes:

a first axle pressure modulator for service brake chambers associated with a first axle of the vehicle;

a second axle pressure modulator for spring brake cylinders associated with a second axle of the vehicle;

the electronic brake control unit configured to issue a first electric control signal for controlling the first axle pressure modulator and a second electric control signal for controlling the second axle pressure modulator;

the intelligent foot brake module configured to issue a first pneumatic control signal for controlling the first axle pressure modulator and a second pneumatic control signal for controlling the second axle pressure modulator;

the electronic parking brake controller configured to issue a second pneumatic parking brake signal for controlling the spring brake cylinders; and     a pressure control valve configured to convert the second pneumatic parking brake signal into a first pneumatic parking brake signal for controlling the first axle pressure modulator.

\* \* \* \* \*